(12) United States Patent
Chester et al.

(10) Patent No.: US 8,838,542 B1
(45) Date of Patent: *Sep. 16, 2014

(54) OPTIMIZED IMAGE ARCHIVING

(71) Applicant: Symantec Corporation, Mountain View, CA (US)

(72) Inventors: Robert Chester, Auckland (NZ); Timothy M. Naftel, Longmont, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/720,364

(22) Filed: Dec. 19, 2012

Related U.S. Application Data (63) Continuation of application No. 12/723,769, filed on Mar. 15, 2010, now Pat. No. 8,346,727.

(51) Int. Cl.
*G06F 17/30* (2006.01)

(52) U.S. Cl.
USPC .................... 707/640; 707/645; 707/646

(58) Field of Classification Search
USPC .................................................. 707/640, 649
See application file for complete search history.

(56) References Cited

U.S. PATENT DOCUMENTS

| | | | |
|---|---|---|---|
| 6,317,815 B1 * | 11/2001 | Mayer et al. | 711/165 |
| 2009/0222496 A1 * | 9/2009 | Liu et al. | 707/204 |
| 2010/0070725 A1 * | 3/2010 | Prahlad et al. | 711/162 |
| 2010/0228913 A1 * | 9/2010 | Czezatke et al. | 711/112 |

* cited by examiner

*Primary Examiner* — Hung Q Pham
(74) *Attorney, Agent, or Firm* — Campbell Stephenson LLP (57) ABSTRACT

An optimized backup image of a virtual machine is generated. The virtual machine is associated with a virtual disk. The virtual disk includes one or more virtual volumes. Generating the optimized backup image includes excluding one or more invalid sectors of the virtual disk from the optimized backup image.

16 Claims, 9 Drawing Sheets

OPTIMIZED IMAGE ARCHIVING

CROSS-REFERENCE TO RELATED APPLICATIONS

This application is a continuation of U.S. patent application Ser. No. 12/723,769, entitled "Optimized Image Archiving," filed Mar. 15, 2010 and issued as U.S. Pat. No. 8,346,727, and naming Robert Chester and Timothy Naftel as the inventors. This application is assigned to Symantec Corporation, the assignee of the present invention, and is hereby incorporated by reference in its entirety and for all purposes as if completely and fully set forth herein.

FIELD OF THE INVENTION

This invention relates to backup systems and, more particularly, to improving the performance of backup operations by reducing time, data storage, and data transmission requirements associated with backup operations performed on a virtual machine.

BACKGROUND OF THE INVENTION

Backup systems are used to protect data against loss. Typically, a backup system includes software that copies the content of one or more disks, volumes, or files to a backup image stored on backup storage media housed in a backup storage device. If data is lost on the original disk, volume, or file, the backed-up content of the data can be retrieved from the backup storage device and restored. Once the backed-up content is restored, the data is available for use.

A virtual machine is a software implementation of a computing system that executes on a physical computing system referred to as a virtual machine hosting platform, frequently referred to simply as a "hosting server." The virtual machine executes instructions as though it is a physical computing system. Resources of the hosting server are allocated to support the virtual machine. These allocated resources can include both "time shares" of a physical resource, such as a "cycle" of a processor and semi-permanent allocations, such as the allocation of space on a disk volume. For example, storage space can be allocated to a virtual machine in the form of a container file on a physical drive. These container files are typically referred to as virtual disks. A hosting server can allocate disk space on physical disks associated with the hosting server to multiple virtual machines. A virtual machine typically includes a configuration file and one or more virtual disks.

Backup of a virtual machine involves copying the configuration file and the content of the host container files representing the virtual disks to a backup image on a backup storage device. Virtual machines can pose difficulties in the performance of backup operations. Current backup solutions require that all storage allocated to a container file must be backed up, without regard to whether the allocated storage currently contains any usable data. Current backup solutions therefore result in needlessly large allocations of space in the backup image to preserve copies of virtual machine volume space that was unused or invalid (e.g., space containing unreferenced data from deleted files). The use of machine time, data transmission bandwidth and storage space to generate and preserve copies of virtual machine volume space that was unused or invalid creates costs in terms of resources better allocated to other operations. It is desirable that these costs be minimized.

SUMMARY OF THE INVENTION

An optimized backup image of a virtual machine is generated. The virtual machine is associated with a virtual disk. The virtual disk includes one or more virtual volumes. Generating the optimized backup image includes excluding one or more invalid sectors of the virtual disk from the optimized backup image.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

While the present invention is susceptible to various modifications and alternative forms, specific embodiments are provided as examples in the drawings and detailed description. It should be understood that the drawings and detailed description are not intended to limit the present invention to the particular form disclosed. Instead, the intention is to cover all modifications, equivalents and alternatives falling within the spirit and scope of the present invention as defined by the appended claims.

DETAILED DESCRIPTION

Embodiments of the current invention facilitate creation of an optimized backup image of virtual machine volume(s)

subject to the backup operation. Aspects of the above embodiments provide for generation of such optimized back images from analysis of virtual machine volumes encapsulated within virtual disks, and by interacting directly with the hosting server rather than individual virtual machines. In one embodiment, a backup server communicates across a network with a hosting server that hosts a virtual machine. The backup server transmits a request for creation of a snapshot of a virtual machine. The snapshot is a point-in-time representation of one or more virtual disks associated with the virtual machine. An optimized backup image is then created, and the optimized backup image excludes sectors that do not contain currently valid data.

Figure 1:
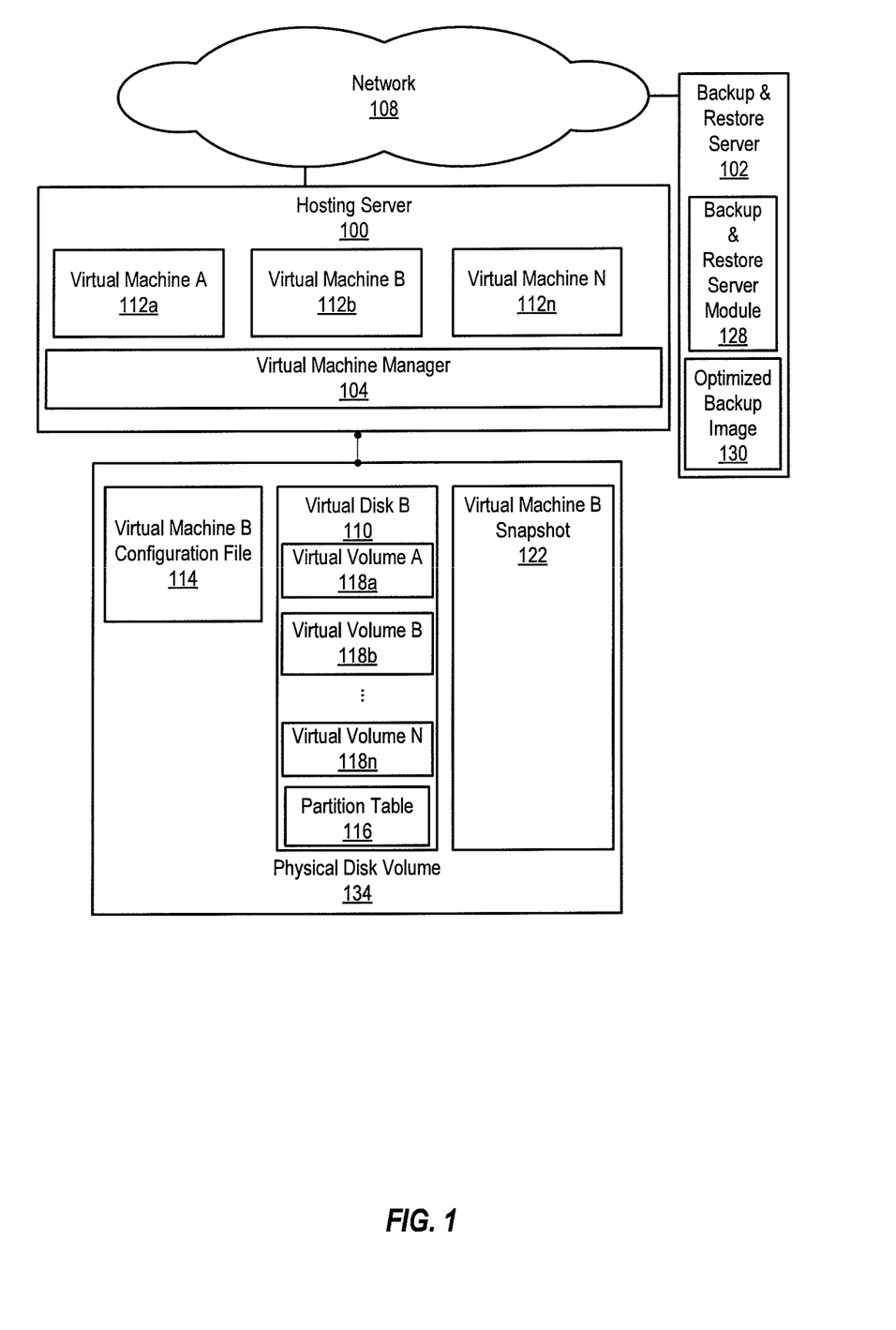
FIG. 1 is a diagram of a hosting server and a backup server interacting across a network in accordance with an embodiment of the present invention.

FIG. 1 is a diagram of a hosting server and a backup server interacting across a network in accordance with an embodiment of the present invention. The components in FIG. 1 can perform backup operations to generate optimized backup images and restore operations from optimized backup images in accordance with an embodiment of the present invention. FIG. 1 includes a hosting server 100 and a backup and restore server 102. Backup and restore server 102 and hosting server 100 are coupled by a network 108. Hosting server 100 can communicate across network 108 with backup and restore server 102 (e.g., using a variety of techniques ranging from API (Application Program Interface) calls to FTP (File Transfer Protocol) and HTTP (Hypertext Transfer Protocol) to email and instant messaging). In another embodiment, backup and restore server 102 be co-located with hosting server 100 or share the same physical hardware of hosting server 100.

Network 108 can include one or more WANs (Wide Area Networks), LANs (Local Area Networks), and/or one or more SANs (Storage Area Networks). Network 108 can be implemented using various media, including coaxial cables, fiber optic cables, and wireless links. In general, an embodiment of network 108 presents a network that allows various computing devices to communicate with each other as well as with the backup system that includes backup and restore server 102. Network 108 may implement various security techniques, such as firewall techniques.

As shown, hosting server 100 executes a virtual machine manager 104. Hosting server 100 supports virtual machines 112a-n through the use of system software, such as virtual machine manager 104 that supports the execution of a series of virtual machines 112a-n. Hosting server 100 can also provide hardware that manages resources to present a hosted virtual environment in each of virtual machines 112a-n. In so doing, each of virtual machines 112a-n is able to operate as if the resources of hosting server 100 were solely under its control, and so share the resources of hosting server 100.

Virtual machine manager 104 supports the sharing of system resources by providing processor resources and memory management to each of virtual machines 112a-n. Such virtualization functionality can be provided, for example, through the use of a system virtual machine (e.g., a hardware virtual machine) that allows sharing of underlying physical resources between virtual machines 112a-n.

In order for virtual machines 112a-n to co-exist with one another, hosting server 100 also needs to be able to coordinate and manage demands for resources of hosting server 100. These needs can be addressed by a virtualization service that is commonly referred to as a "hypervisor" and can be provided by virtual machine manager 104. Virtual machine manager 104 can be executed on "bare hardware" (i.e., executed on physical hardware, without the need for intervening software, and such an arrangement is referred to as a native virtual machine), or alternatively, can interface with the physical hardware via an operating system (also referred to a hosted virtual machine). One or more of the functions of virtual machine manager 104 can be implemented directly in hardware, rather than being implemented in software.

Virtual machines 112a-n execute through the use of memory space and processor cycles of hosting server 100. In one embodiment, each of virtual machines 112a-n, accesses one or more virtual storage resources, which are referred to as virtual disks. In the simplified embodiment shown in FIG. 1, only one virtual disk is shown. Virtual machine B 112b is associated with virtual disk B 110 by virtual machine B configuration file 114. One skilled in the art will, in light of the present disclosure, understand that each of virtual machines 112a-n managed by hosting server 100, would also be associated with one or more virtual disks and a corresponding configuration file that are omitted for the sake of a simplified presentation in FIG. 1. In the embodiment portrayed in FIG. 1, virtual disk B 110 has been partitioned into virtual volumes 118a-n. Each of virtual volumes 118a-n is formatted to accommodate a specific file system. Examples of such file systems include New Technology File System (NTFS) or File Allocation Table (FAT), both of which can be used if virtual machine B 112b is configured to execute a version of the Microsoft Windows™ operating system. If virtual machine B 112b is configured to execute a different operating system, virtual volumes 118a-n can be formatted to accommodate alternative file systems without departing from the scope and intent of the present invention.

While virtual machine configuration files, such as virtual machine B configuration file 114, and virtual disks, such as virtual disk 110, need not be stored on the same physical volume, virtual machine B 112b is portrayed as referencing virtual machine B configuration file 114 and virtual disk B 110, both of which are stored on physical disk volume 134. Other embodiments of the present invention may store virtual disks and virtual machine configuration files on volumes separate from one another without departing from the scope and intent of the present invention.

In response to a request from backup and restore server 102 to create a snapshot of virtual machine B 112b, virtual machine manager 104 generates a stable snapshot of virtual machine B 112b. In order to establish a stable snapshot, virtual machine manager 104 will quiesce virtual volumes 118a-n, if a quiesce operation is supported on hosting server 100. To quiesce a volume is to make the volume consistent (e.g., fully updated to reflect changes to the files on the volume). When an operating system is running, file system structures, such as entries in master file tables (MFTs) of virtual volumes 118a-n, are stored in memory. The quiesce operation flushes to virtual volumes 118a-n all cached data. Where a quiesce operation is available, modified MFT entries in memory are written to virtual volumes 118a-n and data written by applications but still stored in memory will be written to virtual volumes 118a-n. When the quiesce operation is finished, the file system within each of virtual volumes 118a-n is consistent. While some embodiments of the present invention incorporate the quiesce operation in environments that support the operation, embodiments of the present invention do not require such an operation.

Virtual machine manager 104 will next designate virtual machine B 112b as being in a suspended state, and create virtual machine B snapshot 122. Virtual machine manager 104 will then update virtual machine B configuration file 114 to reference the newly-created virtual machine B snapshot 122, rather than virtual disk B 110, and resume operation of virtual machine B 112b. When virtual machine B 112b resumes operation, all write operations will be performed to virtual machine B snapshot 122 and virtual disk B 110 will be left in a stable state for generation of an optimized backup.

In one embodiment, virtual machine B snapshot 122 acts as a copy-on-write (COW) file for virtual disk B 110, allowing the virtual machine B 112b to continue non-backup-related operations while a backup operation is in progress. All write operations performed by virtual machine B 112b are routed to virtual machine B snapshot 122. Read operations by virtual machine B 112b are preferentially routed to virtual machine B snapshot 122 as requests for valid data applicable to the read request. If valid data applicable to a given read request is not present in virtual machine B snapshot 122, then the read request is routed to older snapshots (not shown) and finally, if necessary, to virtual disk B 110. Valid data applicable to a read request is signaled by the presence in virtual machine B snapshot 122 of an indication that applicable data has been initialized by a write operation to virtual machine B snapshot 122. In the example embodiment shown in FIG. 1, no previous snapshots of the virtual machine have been created and the backup process operates on virtual disk B 110. Alternatively, one or more previous snapshots may exist and, in one embodiment, executing a backup operation includes reading both virtual disk B 110 and a chain of previous snapshot files (not shown).

After a stable virtual machine has been established, creation of optimized backup image 130 is undertaken. An optimized backup image 130 is a backup image in which unallocated sectors of a virtual disk are detected and excluded to the extent possible. Sectors and the allocation of sectors are discussed below with respect to FIG. 2. In one embodiment, a virtual disk with multiple snapshots (not shown) is optimized after collapsing the base virtual disk and snapshots into a single virtual disk image. Restoration of this collapsed virtual disk image will not restore previous snapshots. In a second embodiment, multiple snapshots and the base virtual disk image can be optimized and backed up separately, thus backing up multiple images. Restoration of such a set of backup images restores the base virtual disk image and all snapshot images.

Virtual disks, such as virtual disk B 110, can be provisioned as "thin disks" in which sectors are allocated as the virtual machine writes to them or provisioned as "thick disks," in which all the sectors of the virtual disk are pre-allocated. Virtual disks, such as virtual disk B 110, are subdivided by an associated virtual machine into virtual volumes (e.g., virtual volumes A-N 118a-118n). The format and composition of virtual volumes A-N 118a-118n, are typically tied to the operating system running within virtual machine B 112b. For example, if virtual machine B 112b runs Windows 2003, virtual disk B 110 can be configured using a partition table 116. Examples of partition tables include a Master Boot Record (MBR), an Extended Boot Record (EBR), a Globally Unique ID (GUID) Partition Table (GPT), or Logical Disk Manager (LDM) partitioning. Such partitions can be used to create one or more virtual volumes, which can be formatted, using the New Technology File System (NTFS) or File Allocation Table (FAT) file system, for example. While the simplified example discussed with respect to FIG. 1 includes only virtual volumes that are presented on a single virtual disk, embodiments of the present invention, which are discussed below with respect to FIG. 2c, support the case of virtual volumes that span more than one virtual disk, such as those associated with a logical disk manager or configured as a RAID configuration spanning multiple virtual disks.

In one embodiment, the exclusion of invalid or unused sectors is achieved through several steps. The first of those steps is resolution of the known virtual volumes of the virtual machine being backed up. One embodiment of a process for resolving known virtual volumes is discussed below with respect to FIG. 4. Valid virtual sectors, which are sectors holding data valid at the time of the snapshot, are then determined. One embodiment of a process for determining valid virtual sectors is discussed below with respect to FIG. 5. Once valid sectors are determined, an extents list is generated and stored. An extent is a contiguous area of storage in a computer file system reserved for data, and extent information includes an identification of the location of an extent or extents. The extents list contains a listing of the valid virtual sector locations in the virtual disk container file that are to be preserved in a backup operation. One embodiment of a process for generating an extents list is discussed below with respect to FIG. 6. Sector images for the validated sectors identified in the extents list are then stored. One embodiment of a process for storing sector images is discussed below with respect to FIG. 7.

Hosting server 100 is coupled to (or, alternatively, includes) storage devices, such as a physical disk volume 134, which contain files, such as a virtual machine B configuration file 114 and virtual disk B 110 (e.g., a file conforming to the Microsoft virtual hard disk (VHD) or VMware virtual disk (VMDK) format). Backup and restore server 102 includes backup and restore server module 128, which initiates backups of virtual machine files to storage locations such as a optimized backup image 130 on backup and restore server 102 or to other media (not shown) attached to network 108.

Subsequently, backup and restore server module 128 can interact with hosting server 100 to restore the virtual machine files, such as virtual disk B 110 from optimized backup image 130. In one embodiment, restoration of a virtual disk is accomplished by creating a restored virtual disk file on physical volume 134, reading the backed up extents list and delivering the sectors to the locations within the virtual disk file specified in the extents list. In one embodiment, hosting server 100 performs operations related to the handling of extents and generates and sends backup information without notification of virtual machines 112a-n. In another embodiment, a bitmap is used in place of an extent list, where each bit in the bitmap represents a valid or invalid sector within a virtual disk. For simplicity, the present disclosure is discussed with reference to an extent list, but one skilled in the art will readily realize, in light of the present disclosure, that an embodiment employing bitmaps lies within the scope and intent of the present invention.

The backup transaction can be transparent to the user of hosting server 100 or any of virtual machines 112a-n, such that the users of virtual machines 112a-n and virtual machines 112a-n themselves are not notified that hosting server 100 is sending data to backup and restore server module 128, though, in one embodiment, a currently executing virtual machine may experience a slight delay as the volumes are quiesced and snapshot files are created. Embodiments of the present invention allow for the performance of backup operations with respect to virtual machines 112a-n without requiring the installation of any backup software on virtual machines 112a-n. The backup of virtual machine 112b without involvement of the part of the virtual machine is accomplished by handling requests for data at the level of hosting server 100 without transmitting the request to the virtual machines themselves.

In some embodiments, hosting server 100 will participate in traditional network-based backup techniques whenever hosting server 100 is directly connected to network 108. The backup transaction can be transparent to the user of hosting server 100, such that the user is unaware that hosting server 100 is sending data to backup and restore server module 128 (or vice versa). In some such embodiments, hosting server 100 can detect whether hosting server 100 is directly connected to network 108 and select which type of backup techniques to use based upon what type or quality of connection to network 108 is present. While the embodiment explained herein is explained with reference to a networked environment, in alternative embodiments, functions explained as residing on separate servers and clients and being performed across a network will be housed and performed within a single physical machine. Backup media associated with backup and restore server 102 can include sequential storage media such as magnetic tape, a pool of random access media such as hard disk drives, optical disks (e.g., CDs (Compact Discs) and DVDs (Digital Versatile Discs)), and the like.

Figure 2A:
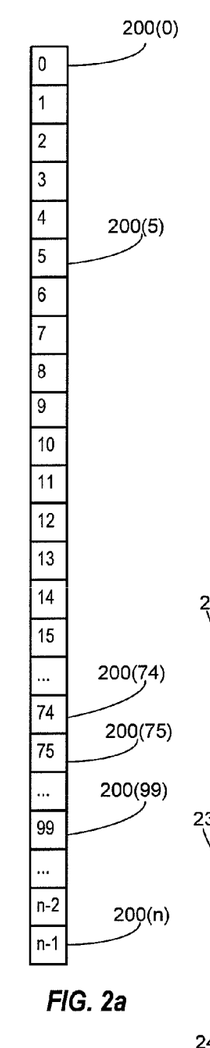
FIG. 2a is a sector diagram of a virtual volume of a virtual disk in accordance with an embodiment of the present invention.

FIG. 2a is a sector diagram of a virtual volume of a virtual disk in accordance with an embodiment of the present invention. The virtual volume is composed of sectors 200(0)-200(n). In one embodiment, sector 0 200(0) contains a file system structure that references a table of unallocated sectors within the virtual volume. In the example presented in FIG. 2a, a virtual disk selected for backup has sectors 200(0)-200(n) allocated to a virtual volume, with only sectors 200(0), 200(5), 200(74), 200(75) and 200(99) currently in use and valid. In the example illustrated in FIG. 2a, Rather than backing up every sector that is allocated to the virtual volume, sectors 200(1)-200(4), 200(6)-200(73), 200(76)-200(98), and 200(100)-200(n) can be excluded from the backup.

Figure 2B:
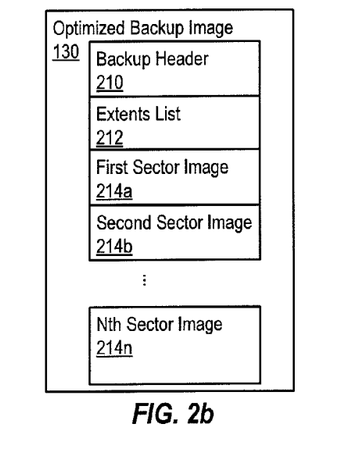
FIG. 2b is a diagram of an optimized backup image in accordance with an embodiment of the present invention.

FIG. 2b is a diagram of an embodiment of an optimized backup image in accordance with an embodiment of the present invention. Optimized backup image 130 contains a backup header 210, which includes information identifying the data that follows as a backup image. Optimized backup image 130 further contains an extents list 212, which is a list identifying the physical locations from which sectors were extracted in creating optimized backup image 130. A process for obtaining the content of the extents list is discussed below with respect to FIG. 5. Optimized backup image 130 further contains N sector images 214a-n, which contain copies of the sectors that have been backed up. Returning to the example discussed with regard to FIG. 2a, sector images 214a-n would include only images of sectors 200(0), 200(5), 200(74), 200(75) and 200(99). Only valid sectors and sectors that could not be explicitly excluded are included in optimized backup image 130. Unused sectors are excluded to the extent that they can be identified, which depends on the ability to identify the format (e.g., NTFS) of virtual volume that is subject to backup operations. Where a virtual volume of an unknown type is present, it can be impossible to identify unused or invalid sectors on that volume. In such cases, all sectors can be included in the backup.

Figure 2C:
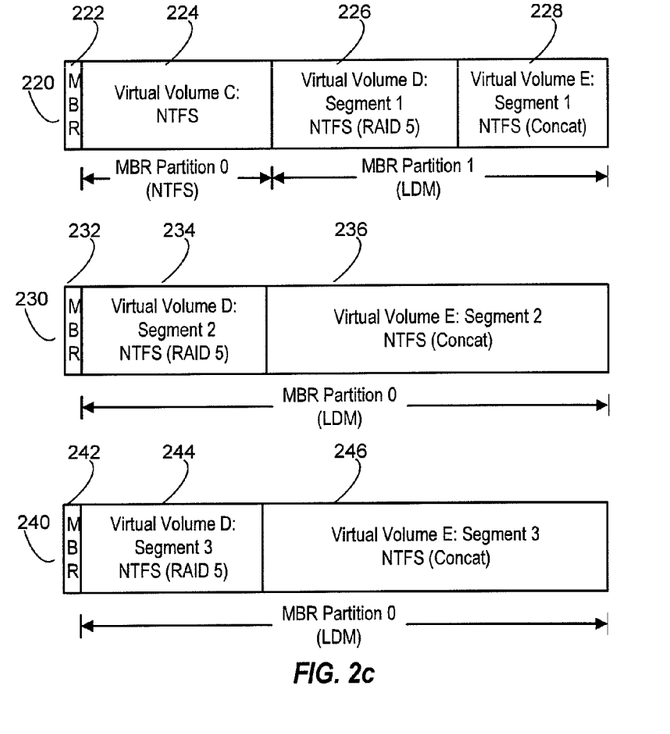
FIG. 2c is a diagram of virtual volumes that span multiple disks in accordance with one embodiment of the present invention.

FIG. 2c is a diagram of virtual volumes that span multiple virtual disks, which are supported by some embodiments of the present invention. In some embodiments of the present invention, the sectors of the virtual volume will not be contiguously located on a single virtual disk. Instead of contiguous sectors such as sectors 200(0)-200(n) of FIG. 2a, sectors containing relevant data can be spread across multiple virtual disks. A software RAID (Redundant Array of Independent Disks) arrangement is an example of an embodiment in which sectors of a virtual volume are spread across multiple virtual disks. A software RAID arrangement combines two or more virtual disks in the creation of a virtual volume.

In the example portrayed in FIG. 2c, three virtual disks and three virtual volumes are portrayed. Virtual volume C: 224 is, in a manner similar to that discussed above with respect to FIG. 2a, present only on first virtual disk 220. A second virtual volume (D:), is embodied as segments, including virtual volume D: segment 1 226 on first virtual disk 220, virtual volume D: segment 2 234 on second virtual disk 230, and virtual volume D: segment 3 244 on third virtual disk 240. A third virtual volume (E:), is embodied as segments, including virtual volume E: segment 1 228 on first virtual disk 220, virtual volume E: segment 2 236 on second virtual disk 230 and virtual volume E: segment 3 246 on third virtual disk 240. Embodiments of the present invention support, as will be discussed below, backup operations that map a virtual volume across multiple virtual disks.

Figure 3:
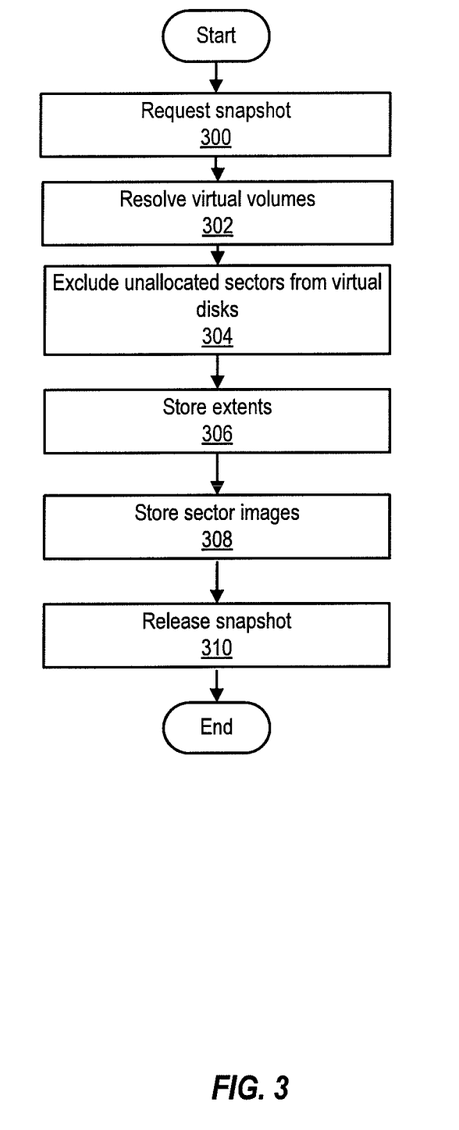
FIG. 3 is a flowchart representing a backup process according to an embodiment of the present invention.

FIG. 3 is a flowchart representing a backup process according to an embodiment of the present invention. The process proceeds to step 300, which depicts requesting a snapshot of a virtual machine. Virtual volumes embedded within virtual disks selected for a backup operation are resolved (302). Resolving a virtual volume typically involves ascertaining a partition type of the virtual volume and discovering information related to how the virtual volume is organized. Using the virtual volume organization information discovered in step 302, a determination is made as to which sectors within the resolved virtual volumes are valid (304). Extents for the valid sectors are then stored (306). Sector images for the selected valid sectors are then stored (308). When the backup process completes storage of valid sectors, the requested snapshot is released (310).

Figure 4:
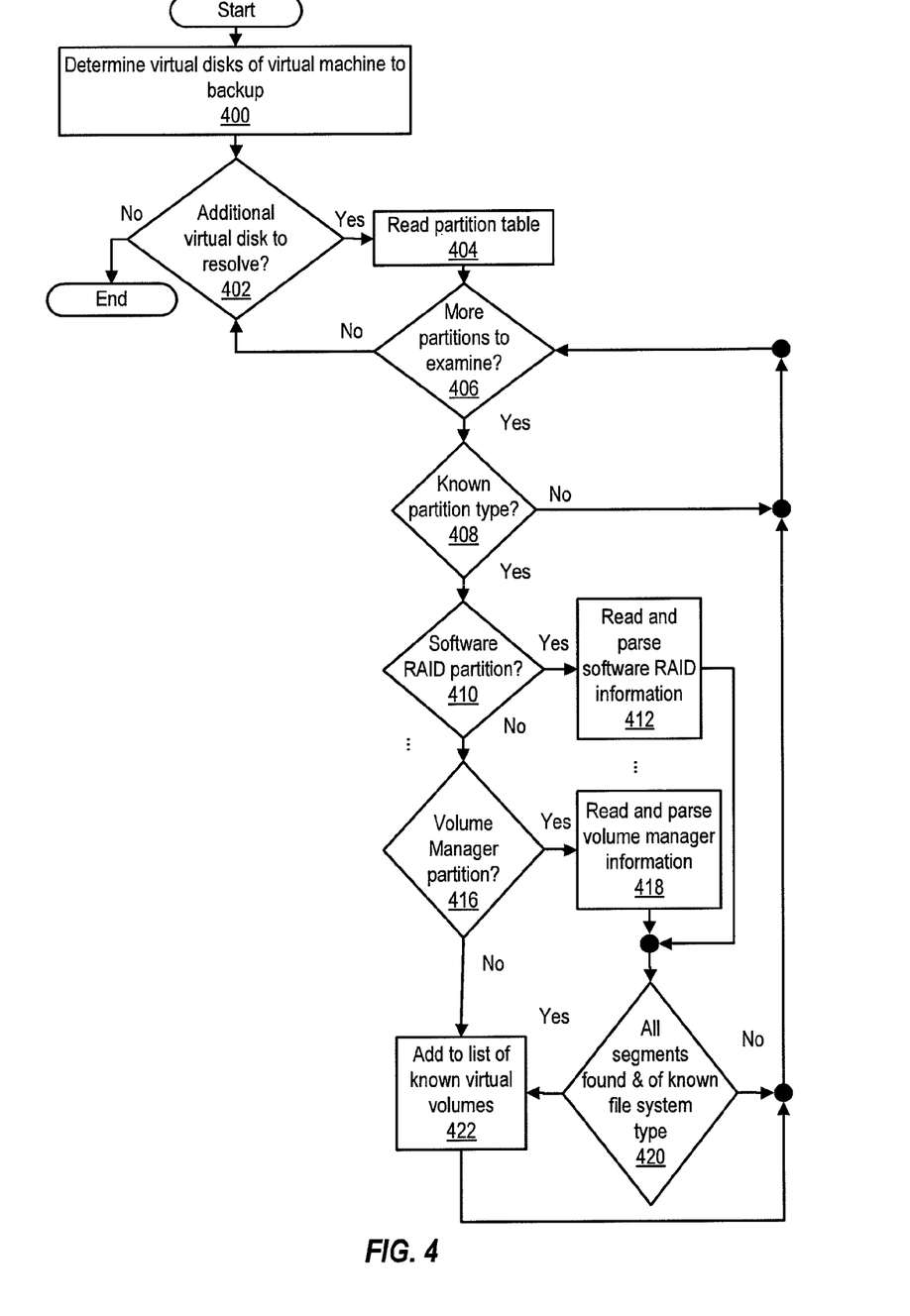
FIG. 4 is a flowchart representing a process for resolving known virtual volumes in accordance with an embodiment of the present invention.

FIG. 4 is a flowchart representing a process for resolving known virtual volumes in accordance with an embodiment of the present invention. The virtual disks to be processed are determined by reading a virtual machine configuration file (400). A determination is made as to whether an additional virtual disk remains for virtual volume resolution (402). If no additional virtual disk remains for resolution, the process ends. If a virtual disk remains for resolution, the partition table for that virtual disk is read (404). A determination is then made as to whether an additional partition remains for examination (406). If no additional partition remains for examination, the process returns to step 402, which is described above.

If an additional partition remains for examination, a determination is made as to whether the partition is of a known partition type (408) (e.g., Windows NT file system, Linux EXT3 file system, RAID, or a partition set up by one of various volume managers, each of which provides a set of standardized information for locating data within the partition). This determination is made by examining the format of the standardized information for locating data within the partition. If the partition is not of a known partition type, then the process returns to step 406. If the partition is of a known type, then a determination is made as to whether the partition is a software RAID partition (410). If the partition is a software RAID partition, software RAID information is read and parsed (412) to determine related segments, which comprise a virtual volume. The process then proceeds to step 420.

If it is determined that the partition is not a software RAID partition (410), a determination is made as to whether the partition is a volume manager partition (416). If a volume manager partition is present, the volume manager information is read and processed (418) to determine segment locations, which are provided in terms of the virtual volumes. Note that steps 410-418 are examples and that embodiments of the present invention support a wide variety of partition types. In one embodiment, each partition type supported will have a determination and read-and-parse function pair such as steps 410 and 412 or 416 and 418, respectively, of FIG. 4. The extensibility of the present invention into read-and-parse function pair such as steps 410 and 412 or 416 and 418 of two sets of ellipses in FIG. 4. As will be apparent to one skilled in the art in light of the present disclosure, support for additional partition types not listed herein does not depart from the scope and intent of the present invention.

A determination is made as to whether all segments of the current virtual volume containing data have been found (420). Examples of a situation in which less than all segments have been found could include a situation in which a segment is stored on a drive that has become inaccessible. If less than all segments of the current virtual volume have been found, then the process returns to step 406, which is described above. If all segments of the virtual volume have been found and the segments form a known file system type, then information for the partition is added to the list of known virtual volumes (422). The process then returns to step 406, which is described above.

Figure 5:
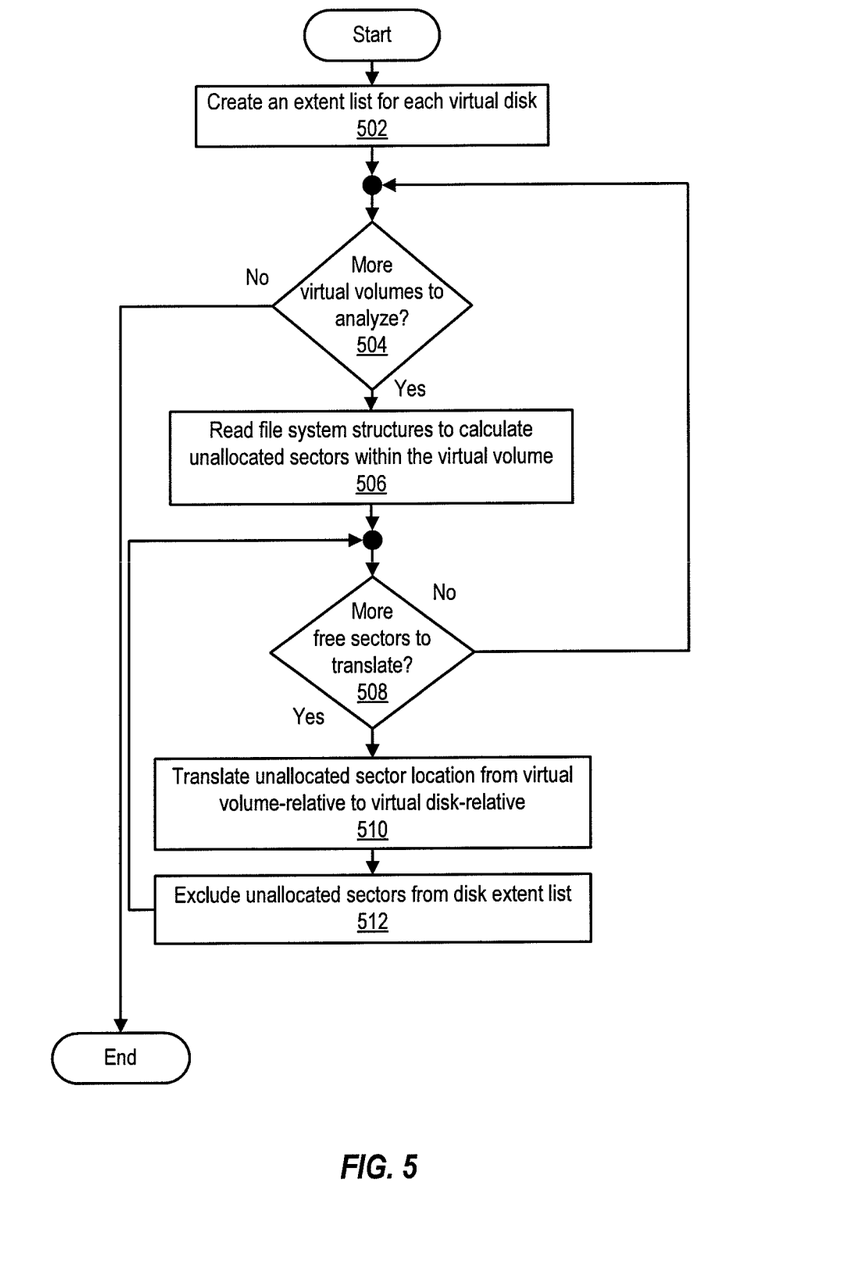
FIG. 5 is a flowchart representing a process for determining valid sectors within virtual volumes in accordance with an embodiment of the present invention.

In one embodiment of the present invention, after the virtual volumes with known file system types are resolved, the valid sectors within those virtual volumes are determined. FIG. 5 is a flowchart representing a process for determining valid sectors within virtual disks in accordance with an embodiment of the present invention. An extent list is created for each virtual disk (502) subject to backup. Initially, an extent list for each virtual disk will contain an uninterrupted listing of all of the sectors used for the container file representing the virtual disk on the host machine.

A determination is made as to whether a known virtual volume remains for analysis (504). If no virtual volume remains for analysis, the process ends. If an additional virtual volume remains for analysis, the file system structures that define the unallocated sectors within the virtual volume are read and unallocated (alternatively called free) sectors are calculated (506). A determination is then made as to whether there are additional unallocated sectors to translate in the current virtual volume (508). If there are no additional unallocated sectors to translate, then the process returns to step 504. If there are additional unallocated sectors to translate, unallocated sector locations are translated from virtual volume-relative locations to virtual disk-relative locations (510).

A file system is organized into sectors and references sectors in a volume relative to the beginning of that volume. Sector 0 starts at a position at the beginning of the volume (referred to as an "offset 0"). In a volume having a 512 byte sector size, sector 1 starts 512 bytes from the beginning of the volume, and so forth. When an unallocated sector is identified, it is identified with a location described relative to the beginning of the virtual volume. Because a volume is embedded within one or more virtual disks, a location translation is performed such that the unallocated sector from the correct location of a specific virtual disk is excluded from backup. For example, a virtual volume can start at a location 32256 bytes from the beginning of a virtual disk. Sector 0 of the virtual volume is translated into offset 32256 of the virtual disk, sector 1 of the virtual volume would be translated into offset 32768 of the virtual disk (for a 512 byte sector size), and so forth through sector N, which represents the last sector within the virtual volume.

In the case of a software RAID 5 virtual volume, the translation becomes more complicated. The virtual volume can span multiple virtual disks and the RAID 5 parity sectors must be accounted for in calculating the translation. One skilled in the art will understand, in light of reading the present disclosure, that such a translation is within the scope and intent of the current invention. It is also assumed that one skilled in the art will understand that the parity sectors are modified to account for the excluded sectors, in that when restored, all previously excluded sectors will contain NULL data. The addresses of the unallocated sectors are then excluded from the virtual disk extent list (512). The process then returns to step 508.

Figure 6:
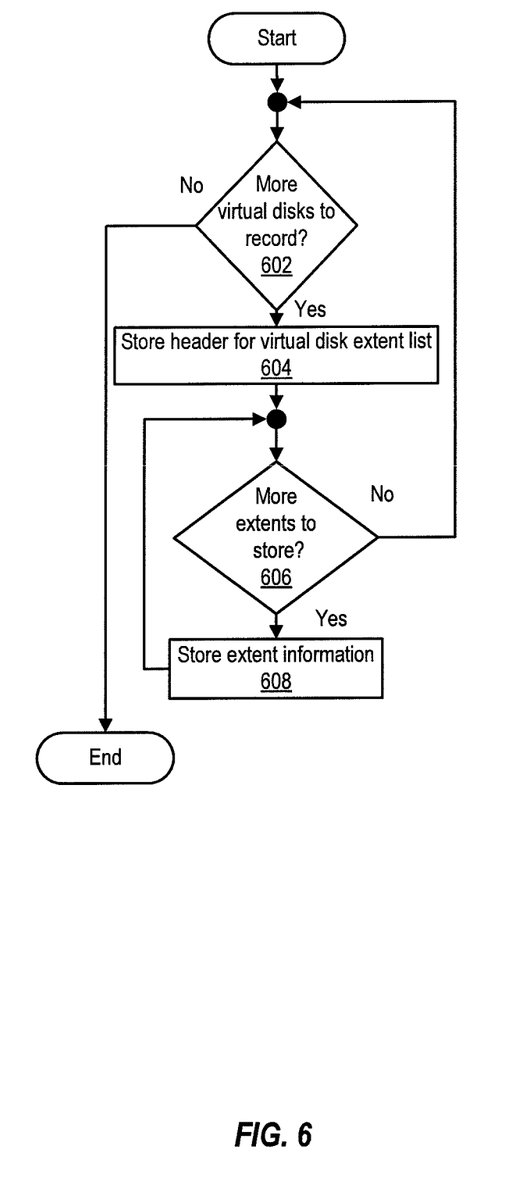
FIG. 6 is a flowchart representing a process for storing extents of a drive on which backup operations are being performed in accordance with an embodiment of the present invention.

In one embodiment of the present invention, after valid sectors are determined, an extent list is stored as part of an optimized backup image. FIG. 6 is a flowchart representing a process for storing extents in accordance with an embodiment of the present invention. A determination is made as to whether there is an additional virtual disk to record by storing extents (602). If there are no virtual disks to record by storing extents, the process ends. If there is an additional virtual disk to record by storing extents, a header for a virtual disk extent list is stored in the associated backup image (604). A determination is then made as to whether there are additional extents to store for the current virtual disk (606). If there are no additional extents to store for the current virtual disk, then the process returns to step 602. If there are additional extents to store, the additional extent information is stored (608). The process then returns to step 606.

Figure 7:
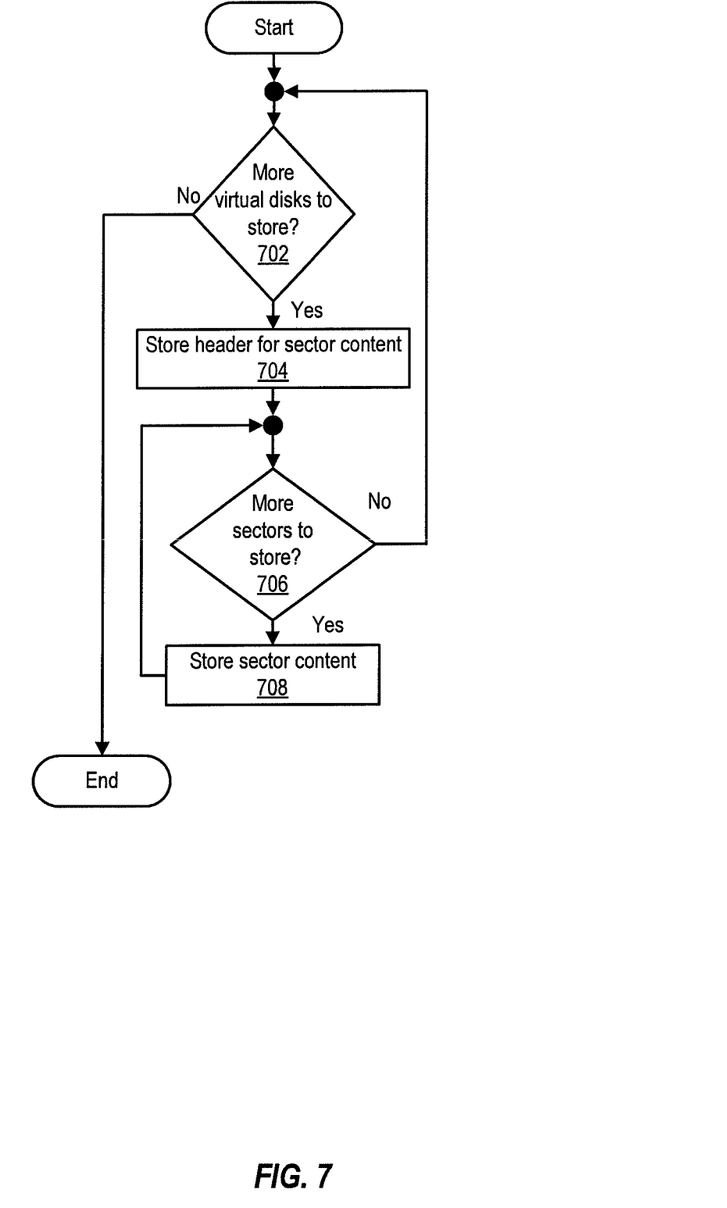
FIG. 7 is a flowchart representing a process for storing sector images of a drive on which backup operations are being performed in accordance with an embodiment of the present invention.

After an extent list is stored, allocated sectors of the virtual disks are stored as part of an optimized backup image. FIG. 7 is a flowchart representing a process for storing sector images in accordance with an embodiment of the present invention. A determination is made as to whether there are more virtual disks to store (702). If there are no more virtual disks to store, the process ends. If there are additional virtual disks to store, a header for virtual disk sector content is stored (704). A determination is then made as to whether there are additional sectors to store for the current virtual disk (706). If there are no additional sectors to store for the current virtual disk, then the process returns to step 702. If there are additional sectors to store, the additional sector content is stored (708). The process then returns to step 706.

Figure 8:
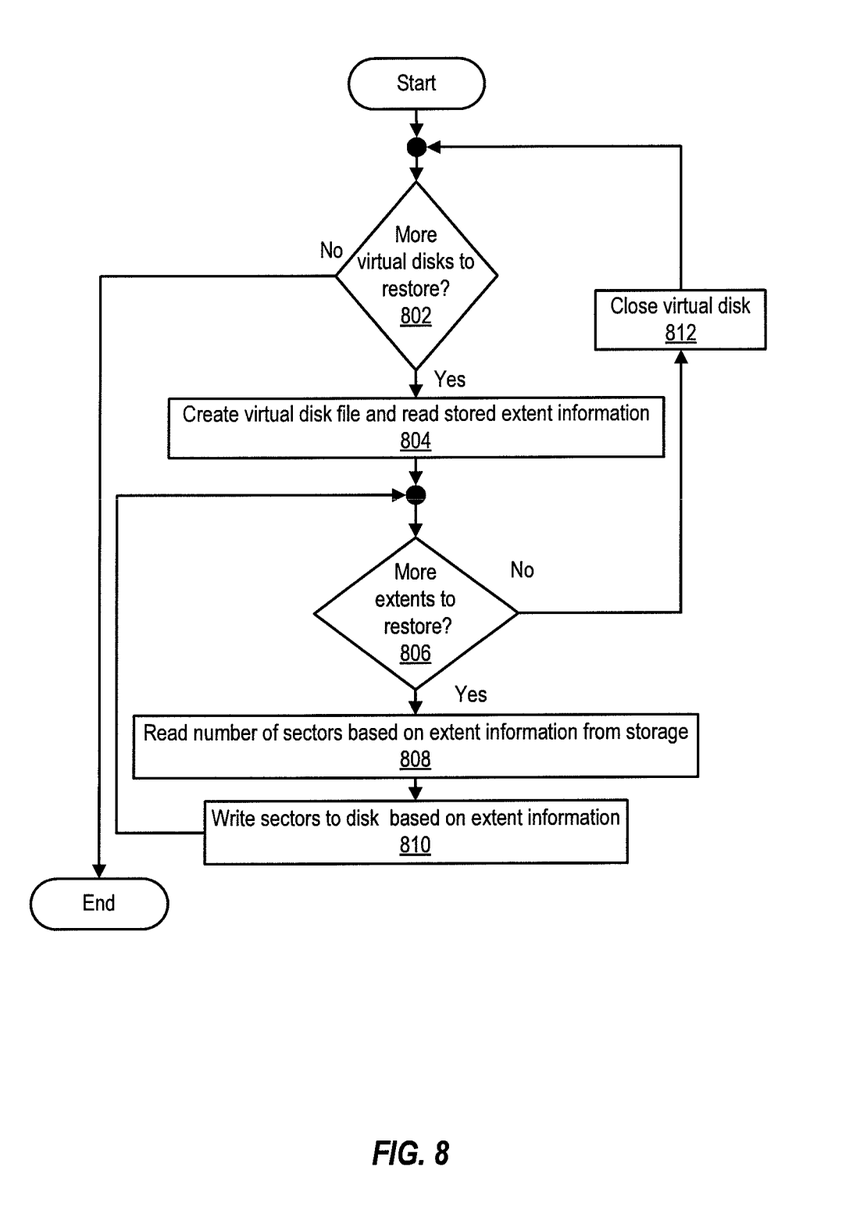
FIG. 8 is a flowchart representing a process for restoring a backup image in accordance with an embodiment of the present invention.

Once an optimized backup image is created, the virtual machine for which the optimized backup was created can be restored using a restoration process. FIG. 8 is a flowchart representing a process for restoring a backup image in accordance with an embodiment of the present invention. A determination is made as to whether there are more virtual disks to restore (802). If there are no more virtual disks to restore, the process ends. If there are additional disks to restore, a virtual disk file is created on the hosting server, the initial contents of the entire virtual disk are set to zero (null data), and the stored extent information is read (804). A determination is then made as to whether there are additional extents, representing sectors of the virtual disk, to restore for the current virtual disk (806). If there are no additional extents to restore for the current virtual disk, then the virtual disk is closed (812) and the process returns to step 802. If there additional extents to restore, the additional sector content is read (808). The additional sector content is then written to disk at the locations provided in the extent information. The process then returns to step 806. The embodiment of a restoration process discussed with respect to FIG. 8 applies to the restoration of a thick provisioned virtual disk. As will be apparent to one skilled in the art in light of the present disclosure, support for thin provisioned virtual disks, while not discussed herein, is also within the scope and intent of the present invention.

An additional advantage of the present invention arises from the restoration of a thin provisioned virtual disk. The use of thin provisioned virtual disks will result in ongoing allocation of space within the virtual disk as new areas are written to by the virtual machine operating system. Over time, this ongoing allocation has the result that thin provisioned disks can become highly fragmented. Running defragmentation software within a virtual machine using a thin virtual disk can sometime exacerbate file fragmentation. The restoration of a thin virtual disk essentially defragments the virtual disk, in that sectors are written in order causing in-order allocation.

An alternative embodiment of the present invention relates to backup operations performed for physical systems. In this embodiment, physical disks are discovered by querying a host operating system. Snapshots are created for the physical disks. Each physical disk snapshot is opened as a liner file and the processing of physical disk snapshots is materially similar to the processing discussed above for virtual disks. Likewise, the resolution of physical volumes within snapshots is materially similar to the resolution discussed above for of virtual volumes, and the exclusion of unallocated sectors is materially similar to the exclusion discussed above for sectors of virtual disks. The resulting optimized backup image contains extent information followed by the allocated sectors of each physical disk snapshot.

As discussed above, embodiments of the current invention facilitate creation of an optimized backup image of virtual disks(s) subject to a backup operation. Aspects of the above embodiments provide for generation of such optimized back images from virtual disks by interacting directly with the hosting server rather than individual virtual machines.

Figure 9:
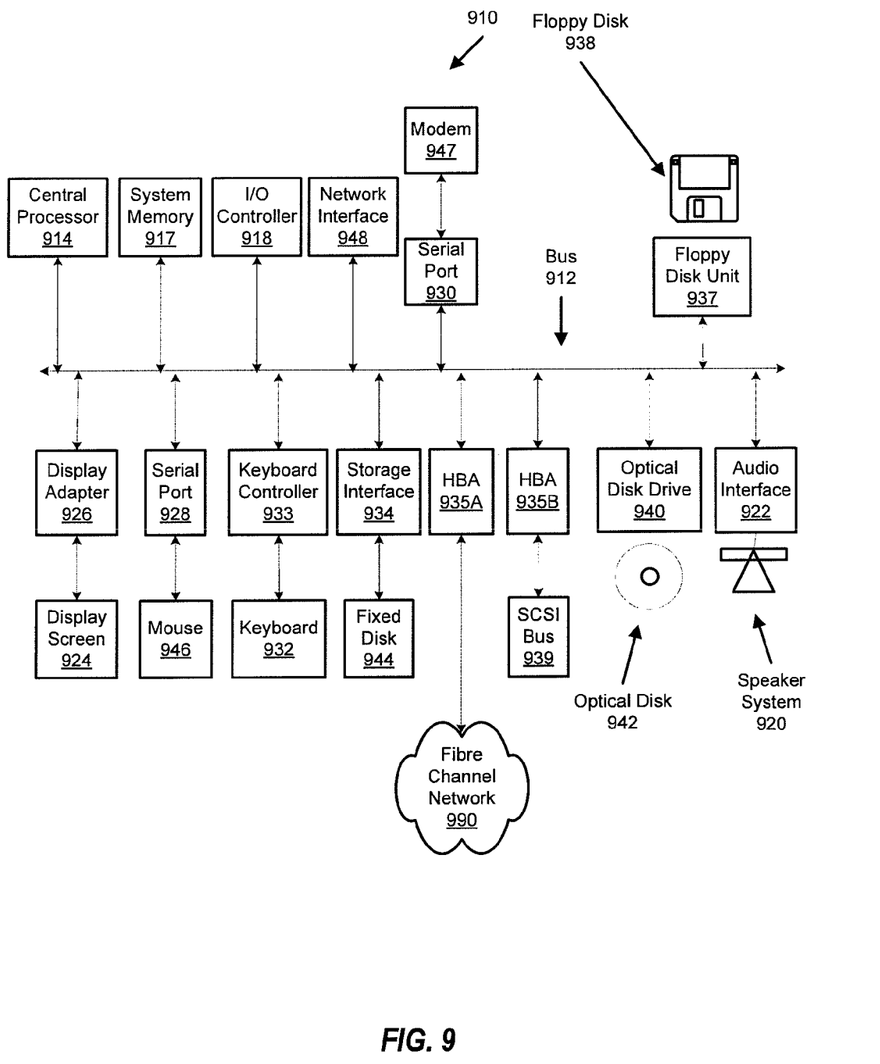
FIG. 9 is a diagram of a computing system for performing operations in accordance with an embodiment of the present invention.

FIG. 9 is a diagram of a computing system for performing operations in accordance with an embodiment of the present invention. FIG. 9 depicts a block diagram of a computer system 910 suitable for implementing a server (e.g., hosting server 100 or backup and restore server 104 of FIG. 1) used therein. Computer system 910 includes a bus 912, which interconnects major subsystems of computer system 910, such as a central processor 914, a system memory 917 (typically random-access memory (RAM), but which may also include read-only memory (ROM), flash ROM, or the like), an input/output controller 918, an external audio device, such as speaker system 920 via an audio output interface 922, an external device, such as a display screen 924 via display adapter 926, serial ports 928 and 930, a keyboard 932 (interfaced with keyboard controller 933), a storage interface 934, a floppy disk drive 937 operative to receive a floppy disk 938, a host bus adapter (HBA) interface card 935A operative to connect with a Fibre Channel network 990, a host bust adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917, which may include read-only memory (ROM) or flash memory (neither shown) and random access memory (RAM) (not shown), as previously noted. RAM is generally the main memory into which OS and application programs are loaded. ROM or flash memory can contain, among other code, the Basic Input-Output system (BIOS) which controls basic hardware operation such as the interaction with peripheral components. Applications resident with computer system 910 are generally stored on and accessed via a computer-readable storage medium, such as hard disk drive (e.g., fixed disk 944), an optical drive (e.g., optical drive 940), a floppy disk unit 937, or other computer-readable storage media.

Storage interface 934, as with other storage interfaces of computer system 910, can connect to a standard computer-readable storage medium for storage and/or retrieval of information, such as a fixed disk drive 944. Fixed disk drive 944 may be a part of computer system 910, or may be separate and accessed through other interface systems. Modem 947 can be employed to provide a direct connection to a remote server via a telephone link or to the Internet via an internet service provider (ISP). Network interface 948 may provide a direct connection to a remote server via a direct network link to the Internet via a point-of-presence (POP). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras, and so on). Conversely, all of the devices shown in FIG. 9 need not be present. The devices and subsystems can be interconnected in different ways from that shown in FIG. 9. The operation of the computer system such as that shown in FIG. 9 is readily known in the art and is not discussed in detail in this application. Code to implement the previously-described features can be stored in computer-readable storage media such as one or more of system memory 917, fixed disk 944, optical disk 942, or floppy disk 938. The OS provided on computer system 910 can be, for example, MS-DOS®, MS-WINDOWS®, OS/2®, UNIX®, Linux®, or other known OS.

While the present invention is, for the sake of simplicity and clarity in presentation, explained with respect to an example embodiment intended performing a backup operation to generate an optimized backup image of a single virtual machine, one skilled in the art will realize, in light of the present disclosure, that the present invention is not so limited. One skilled in the art will discern, in light of the present disclosure, that the present invention may be applied to perform backup operations to generate optimized backup images for multiple disks and multiple virtual machines, and that the present invention may also be applied to backup operations performed with respect to physical systems.

Moreover, regarding the messages and/or data signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signals is transmitted between the blocks. To some extent, a signal input at a second block may be conceptualized as a second signal derived from a first signal output from a first block due to the physical limitations of the circuitry involved (e.g., there will inevitably be some attenuation and delay). Therefore, as used herein, a second signal derived from the first signal includes the first signal or any modifications to the first signal, whether due to circuit limitations or due to passage through other circuit elements which do not change the informational and/or final functional aspect of the first signal.

Many of the components and their functions described herein may be combined into alternative forms or integrated into other programs such as applications or an operating system. In one embodiment, instructions for implementing many of these components and their functions may be combined into a special-purpose physical circuit. Each such embodiment may implement the present invention without departing from the scope of the recited claims.

Although the present invention has been described with respect to a specific preferred embodiment thereof, various changes and modifications may be suggested to one skilled in the art and it is intended that the present invention encompass such changes and modifications that fall within the scope of the appended claims.

What is claimed is:

1. A method comprising:
   receiving a request to backup a virtual machine, wherein the virtual machine comprises a virtual disk;
   identifying at least one valid sector of the virtual disk, wherein the virtual disk comprises the at least one valid sector to be included in a backup image, and a plurality of invalid sectors to be excluded from the backup image, and
   the identifying comprises:
      creating an extent list of locations of the at least one valid sector, wherein the created extent list initially contains an uninterrupted listing of all of the sectors, and
      excluding virtual disk-relative locations of the plurality of invalid sectors of the virtual disk from the extent list; and
   performing a backup operation in response to the request, wherein the performing comprises:
      storing a copy of the at least one valid sector in the backup image, and
      excluding the plurality of invalid sectors from the backup image, and
      the extent list is stored in the backup image.

2. The method of claim 1, further comprising:
   identifying virtual volume-relative locations of the plurality of invalid sectors; and
   translating the virtual volume-relative locations to virtual disk-relative locations.

3. The method of claim 1, wherein the virtual disk comprises a plurality of virtual volumes.

4. The method of claim 1, further comprising:
   performing a restore operation, wherein
   the restore operation comprises copying content from the backup image to the virtual disk, and the virtual disk is defragmented in response to and upon performing the restore operation.

5. The method of claim 1, further comprising:
   generating a snapshot of the virtual disk; and
   operating the virtual machine from the snapshot during the backup operation.

6. The method of claim 1, further comprising:
   examining a configuration file associated with the virtual machine to identify the virtual disk as being associated with the virtual machine; and
   reading a partition table of the virtual disk.

7. A non-transitory computer-readable storage medium storing instructions executable by a processor to:
   receive a request to backup a virtual machine, wherein the virtual machine comprises a virtual disk;
   identify at least one valid sector of the virtual disk, wherein the virtual disk comprises the at least one valid sector to be included in a backup image, and a plurality of invalid sectors to be excluded from the backup image, and
   the identifying comprises:
      creating an extent list of locations of the at least one valid sector, wherein the created extent list initially contains an uninterrupted listing of all of the sectors, and
      excluding virtual disk-relative locations of the plurality of invalid sectors of the virtual disk from the extent list; and
   perform a backup operation in response to the request, wherein
   performing the backup operation comprises:
      storing a copy of the at least one valid sector in the backup image, and
      excluding the plurality of invalid sectors from the backup image, and
      the extent list is stored in the backup image.

8. The non-transitory computer-readable storage medium of claim 7, wherein the instructions are further executable to:
   identify virtual volume-relative locations of the plurality of invalid sectors; and
   translate the virtual volume-relative locations to virtual disk-relative locations.

9. The non-transitory computer-readable storage medium of claim 7, wherein the instructions are further executable to:
   perform a restore operation, wherein
   the restore operation comprises copying content from the backup image to the virtual disk, and the virtual disk is defragmented in response to and upon performing the restore operation.

10. The non-transitory computer-readable storage medium of claim 7, wherein the instructions are further executable to:
    generate a snapshot of the virtual disk; and
    operate the virtual machine from the snapshot during the backup operation.

11. The non-transitory computer-readable storage medium of claim 7, wherein the instructions are further executable to:
    examine a configuration file associated with the virtual machine to identify the virtual disk as being associated with the virtual machine; and
    read a partition table of the virtual disk.

12. A system comprising:
    one or more processors; and
    a memory coupled to the one or more processors, wherein the memory stores program instructions executable by the one or more processors to:
    receive a request to backup a virtual machine, wherein the virtual machine comprises a virtual disk;
    identify at least one valid sector of the virtual disk, wherein the virtual disk comprises the at least one valid sector to be included in a backup image, and a plurality of invalid sectors to be excluded from the backup image, and
    the identifying comprises:
       creating an extent list of locations of the at least one valid sector, wherein the created extent list initially contains an uninterrupted listing of all of the sectors, and
       excluding virtual disk-relative locations of the plurality of invalid sectors of the virtual disk from the extent list; and
    perform a backup operation in response to the request, wherein
    performing the backup operation comprises:
    storing a copy of the at least one valid sector in the backup image, and
    excluding the plurality of invalid sectors from the backup image, and
    the extent list is stored in the backup image.

13. The system of claim 12, wherein the instructions are further executable to:
    identify virtual volume-relative locations of the plurality of invalid sectors; and
    translate the virtual volume-relative locations to virtual disk-relative locations.

14. The system of claim 12, wherein the instructions are further executable to: perform a restore operation, wherein
    the restore operation comprises copying content from the backup image to the virtual disk, and the virtual disk is defragmented in response to and upon performing the restore operation.

15. The system of claim 12, wherein the instructions are further executable to:
- generate a snapshot of the virtual disk; and
- operate the virtual machine from the snapshot during the backup operation.

16. The system of claim 12, wherein the instructions are further executable to:
- examine a configuration file associated with the virtual machine to identify the virtual disk as being associated with the virtual machine; and
- read a partition table of the virtual disk.

\* \* \* \* \*